United States Patent
Ward et al.

(10) Patent No.: US 8,959,850 B2
(45) Date of Patent: Feb. 24, 2015

(54) WALL ENTRY TUNNEL FOR A PET DOOR

(71) Applicant: Radio Systems Corporation, Knoxville, TN (US)

(72) Inventors: Eric A. Ward, Knoxville, TN (US); Marc E. Brush, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 13/891,751

(22) Filed: May 10, 2013

(65) Prior Publication Data

US 2013/0305636 A1   Nov. 21, 2013

Related U.S. Application Data

(60) Provisional application No. 61/647,462, filed on May 15, 2012.

(51) Int. Cl.
*E06B 1/04* (2006.01)
*E06B 7/32* (2006.01)
*E06B 1/52* (2006.01)
*A01K 1/035* (2006.01)

(52) U.S. Cl.
CPC ... *E06B 7/32* (2013.01); *E06B 1/52* (2013.01); *A01K 1/035* (2013.01)
USPC ........... 52/204.1; 52/79.8; 52/205; 52/745.15

(58) Field of Classification Search
CPC ............... E06B 1/00; E06B 1/02; E06B 1/52; E06B 1/60; E06B 1/6046; E06B 7/32
USPC ........ 52/79.7, 79.8, 79.9, 204.1, 204.56, 205, 52/213, 217, 716.4, 717.01, 718.01, 52/718.02, 745.15; 49/169, 171, 464, 505; 160/180; 220/3.2–3.94
See application file for complete search history.

(56) References Cited

U.S. PATENT DOCUMENTS

| | | | |
|---|---|---|---|
| 4,115,656 A * | 9/1978 | Aitel | 174/380 |
| 4,140,080 A | 2/1979 | Snader | |
| 4,228,630 A * | 10/1980 | Englert et al. | 52/656.9 |
| 4,420,905 A | 12/1983 | Kucharczyk | |
| 5,287,654 A * | 2/1994 | Davlantes | 49/169 |
| 5,469,807 A | 11/1995 | Kosmaczeska | |
| 5,603,424 A * | 2/1997 | Bordwell et al. | 220/3.5 |
| 6,170,685 B1 * | 1/2001 | Currier | 220/3.3 |
| 7,331,146 B1 * | 2/2008 | Beutler et al. | 52/204.56 |
| 2007/0204514 A1 * | 9/2007 | Grimmett | 49/169 |
| 2008/0245313 A1 | 10/2008 | Jakubowski et al. | |
| 2009/0031964 A1 | 2/2009 | Proxmire | |

OTHER PUBLICATIONS

International Search Report and Written Opinion for PCT/US13/40977 mailed May 14, 2013.

\* cited by examiner

*Primary Examiner* — Charles A Fox
*Assistant Examiner* — Patrick Maestri
(74) *Attorney, Agent, or Firm* — Merchant & Gould, PC

(57) ABSTRACT

A wall entry tunnel for use with a pet door. The wall entry tunnel extends through a structural feature and forms an enclosed passageway connecting the interior and exterior frames of a pet door. The length of the wall entry tunnel adjusts to fit structural features of various thicknesses. The wall entry tunnel includes modular components that facilitate compact packaging and are readily assembled to construct the enclosed passageway with a perimeter sized to match the size of the pet door opening.

17 Claims, 15 Drawing Sheets

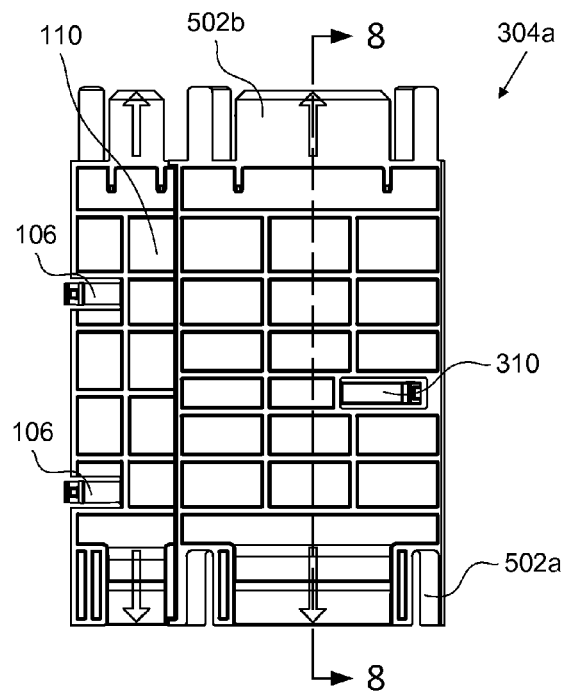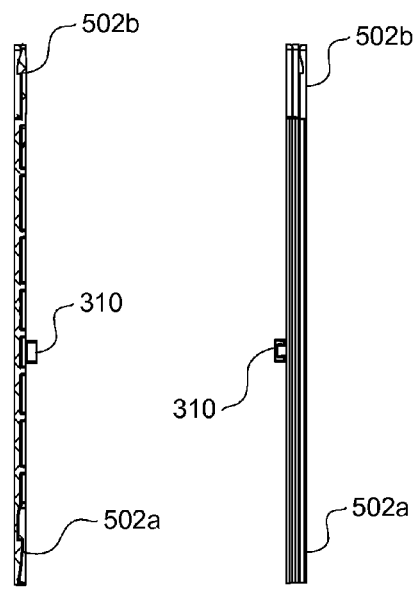
Fig. 7    Fig. 8    Fig. 9
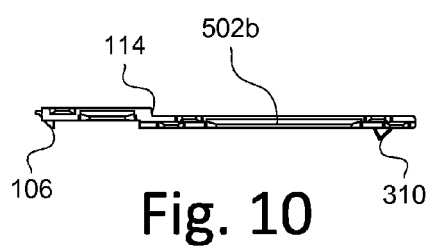
Fig. 10
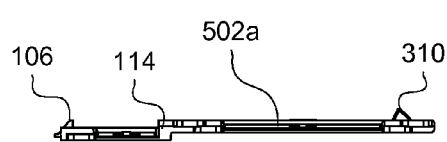
Fig. 11
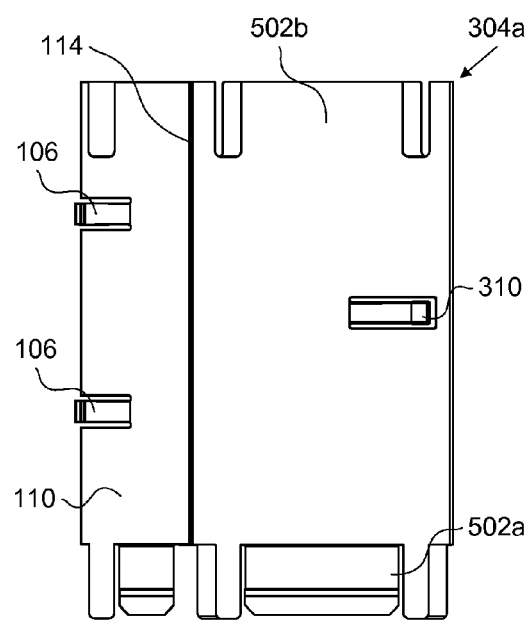
Fig. 12

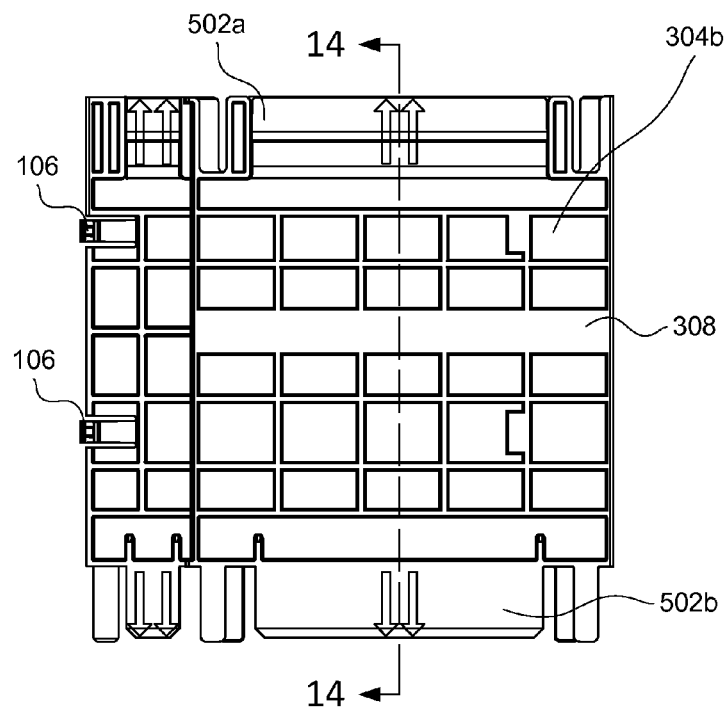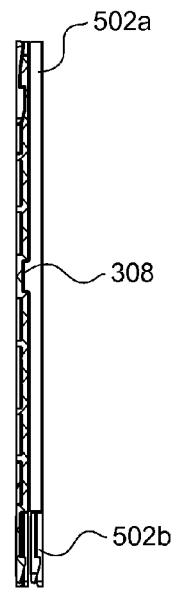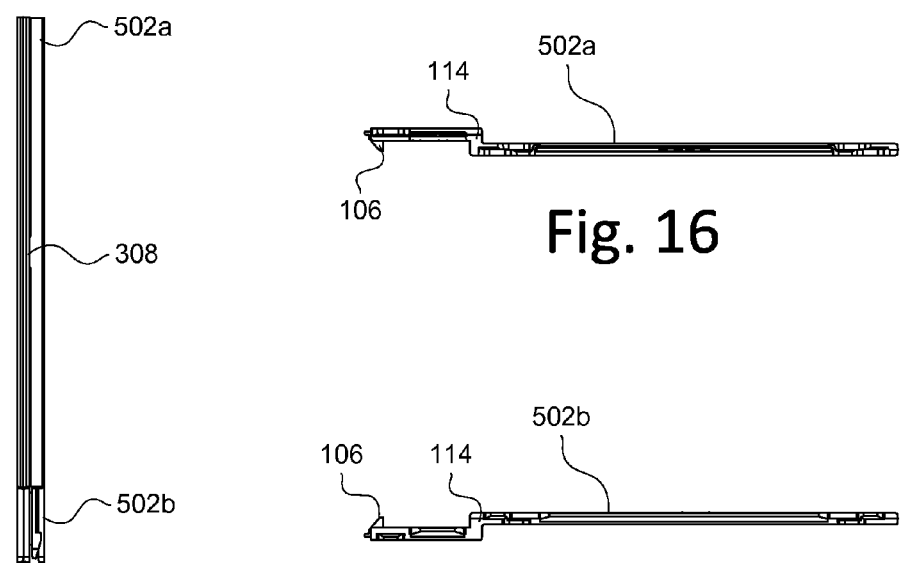
Fig. 13
Fig. 14
Fig. 15
Fig. 16
Fig. 17

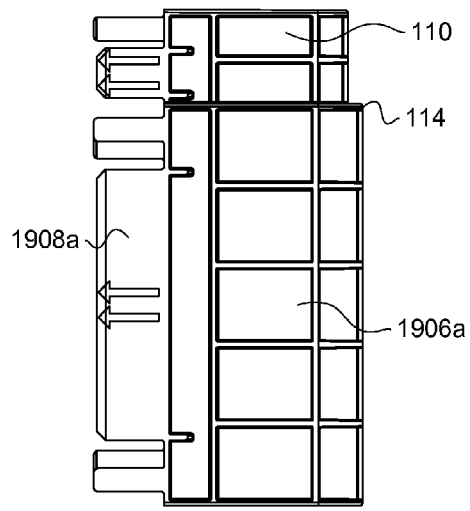
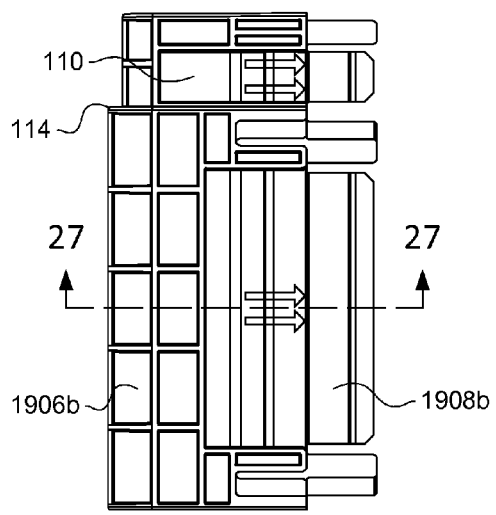
Fig. 25　　　　　　　Fig. 26
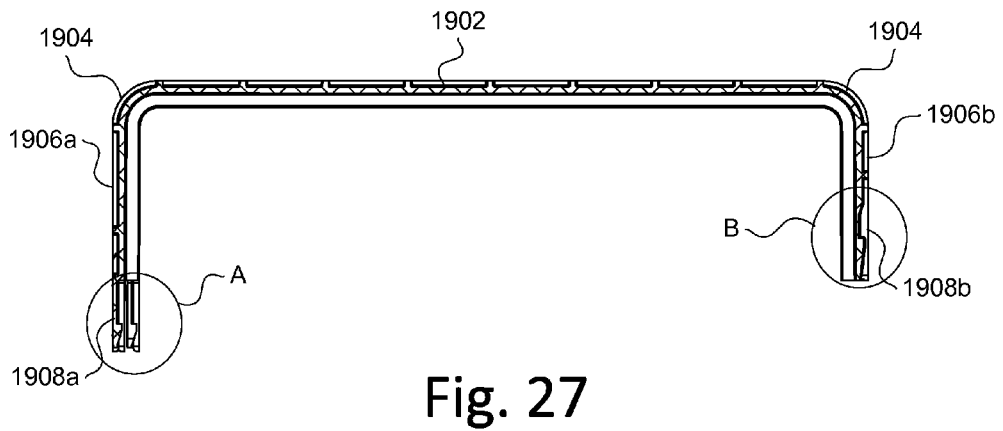
Fig. 27
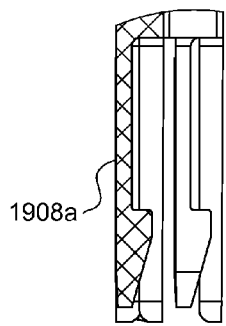
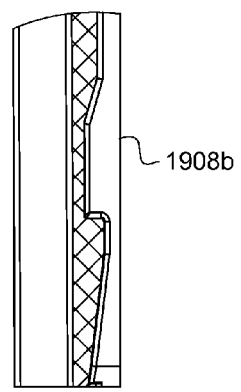
Fig. 28　　　　　　　Fig. 29

WALL ENTRY TUNNEL FOR A PET DOOR

BACKGROUND

Most conventional pet doors generally include inner and exterior frames designed to be installed in a standard door or other structural unit of similar thickness. The thickness of standard interior and exterior doors is generally between 31.8 mm (1.25 in) and mm 57.1 mm (2.25 in) with 34.9 mm (1.375 in) and 44.4 mm (1.75 in) being most common for interior and exterior doors, respectively. The installation is intended to involve only cutting an opening in the standard door and securing the inner and exterior frames around the opening. Most conventional pet doors are designed to accommodate different thicknesses within the limited range of thicknesses found in standard doors. With few exceptions, they are not designed for installation into a structural feature with a thickness larger than approximately 76.2 mm (3 in), such as a wall. A basic exterior wall of a structure often has thickness of 152.4 mm (6 in) or more. When installing a conventional pet door into a wall, the options are limited.

One option is simply to install the inner and exterior frames around the opening and leave an unenclosed passageway through the interior of the wall between the inner and exterior frames. This option is generally unacceptable as the pet door then provides access to objects normally enclosed in the wall, such as the ends of construction fasteners (e.g., nails, screws), insulation materials, wiring, and plumbing. In addition, this option does not offer a particularly good environmental seal. Moreover, once outside the limited range of thicknesses found in standard doors, complications arise when trying to install a conventional pet door in structures having a thickness greater than that for which the pet door was designed and/or when trying to facilitate standardized installation in structural features having a wide range variance in thicknesses.

Another option is to build a custom tunnel through the wall using standard building materials. This significantly increases the skill and tools needed and the time, effort, and expense involved in installing the pet door. It is with respect to these and other considerations that the present invention has been made.

BRIEF SUMMARY

Embodiments of the present invention may provide a wall entry tunnel for use with a pet door. The wall entry tunnel extends through a structural feature and forms an enclosed passageway connecting the interior and exterior frames of a pet door. The length of the wall entry tunnel adjusts to fit structural features of various thicknesses. The wall entry tunnel includes modular components that facilitate compact packaging and are readily assembled to construct the enclosed passageway with a perimeter sized to match the size of the pet door opening.

The wall entry tunnel forms an enclosed passageway between the frames of a pet door. The length of the wall entry tunnel is variable through non-destructive modification to match the thickness of the structural feature (e.g., wall) through which the wall entry tunnel passes. In various embodiments, the wall entry tunnel includes two or more telescoping tunnel sections that allow the length of the wall entry tunnel to be varied. In other words, the tunnel sections are connected such that an inner tunnel section slides into an outer tunnel section in a telescopic relationship.

The wall entry tunnel is designed to allow a standard pet door to be installed in structural features with a wide range of thicknesses. To facilitate installation over a large range of thickness, various embodiments of the wall entry tunnel provide mounting hardware to use in place of that provided with the pet door. In various embodiments, the wall entry tunnel includes an anti-rotation toggle bolt. In other embodiments, the wall entry tunnel includes a threaded fastener (e.g., rod, bolt, or screw) and at least one binder post.

The tunnel sections are assembled from a plurality of connectable wall components including at least two horizontal wall components. To incrementally vary the height of the wall entry tunnel, one or more vertical wall components are combined to form the left and right vertical walls connected between the horizontal wall components of each tunnel section.

The vertical wall components have slide components connecting the inner tunnel section to the outer tunnel section. In various embodiments, the slide components include a groove defined by one tunnel section and a slide projecting from the tunnel section that operatively engages the groove. The slide travels in the groove allowing the length of the wall entry tunnel to be selectively adjusted within the range allowed for by the groove. In various embodiments, the range of extension (i.e., the adjustable length) of the wall entry tunnel is limited using slide stops at one or both ends of the grooves to limit the travel of the slides.

Each vertical wall component is a substantially planar member with top end and a bottom end. The vertical wall components are configured to be interconnected. Specifically, the top and bottom ends of the vertical wall components are configured to connect with each other to create a vertical wall of a selected height. In various embodiments, the ends of the vertical wall components are connectors (e.g., as snaps or clips). In some embodiments, the top and bottom ends of the vertical wall components interlock when connected. In the some embodiments, the connectors are snap fittings including a flexible latch that fits into a fixed receiver portion with the snap detail oriented to hold the assembly together in tension. The connectors cooperate to provide a secure fit between the vertical wall components. In various embodiments, the connectors form permanent connections once connected. In other embodiments, the connectors form releasable connections for non-destructive disassembly.

The horizontal wall component includes a horizontal section, which is substantially planar, between two corner sections. Each corner section transitions into a vertical extension that is substantially perpendicular to the horizontal section. The overall height of the wall entry tunnel is based on the height of the vertical extensions of the horizontal wall components, the height of the vertical wall components, and the number of vertical wall components connected together. Typically, the height of a single vertical wall component is standardized as an increment of the height of the pet door opening. The height of the vertical extensions of the horizontal wall component is based on the difference between the vertical wall component height and the height of the pet door opening. This allows the same vertical wall components to be used with different sized horizontal wall components to assemble wall entry tunnels for different sized pet door openings.

The ends of the vertical extensions are configured to connect to the top and bottom ends of the vertical wall components forming part of the corresponding tunnel section. In various embodiments, the connectors defined by the ends of the vertical extensions and the top and bottom ends of the vertical wall components are keyed to maintain the orientation of the wall components being joined. Controlling the relative orientation of the wall components during assembly ensures that the orientation of the frame locking tabs, and grooves, and slides remains consistent and avoids the need to disassemble wall components due to mis-orientation of the slides or grooves. In various embodiments, the ends includes complimentary key components (e.g., alignment tabs and corresponding slots) to aid the assembly process. The alignment tabs fit into the slots to properly align the wall components prior to reaching the point where the connectors interlock.

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

FIG. 7 is a top plan view of one embodiment of the inner vertical wall component;

FIG. 8 is a sectional side elevation view of one embodiment of the inner vertical wall component taken along line 8-8 of FIG. 7;

FIG. 9 is a left side elevation view of one embodiment of the inner vertical wall component;

FIG. 10 is a front elevation view of one embodiment of the inner vertical wall component;

FIG. 11 is a rear elevation view of one embodiment of the inner vertical wall component;

FIG. 12 is a bottom plan view of one embodiment of the inner vertical wall component;

FIG. 13 is a top plan view of one embodiment of the outer vertical wall component;

FIG. 14 is a sectional side elevation view of one embodiment of the outer vertical wall component taken along line 14-14 of FIG. 13;

FIG. 15 is a left side elevation view of one embodiment of the outer vertical wall component;

FIG. 16 is a front elevation view of one embodiment of the outer vertical wall component;

FIG. 17 is a rear elevation view of one embodiment of the outer vertical wall component;

FIG. 25 is a left side elevation view of one embodiment of the horizontal wall component;

FIG. 26 is a right side elevation view of one embodiment of the horizontal wall component;

FIG. 27 is a sectional front elevation view of one embodiment of the horizontal wall component taken along line 27-27 in FIG. 26;

FIG. 28 is sectional front elevation detail view of the first keyed fastener part from inset A of FIG. 27;

FIG. 29 is sectional front elevation detail view of the second keyed fastener part from inset B of FIG. 27;

DETAILED DESCRIPTION

A wall entry tunnel for use with a pet door is described herein and illustrated in the accompanying figures. The wall entry tunnel extends through a structural feature and forms an enclosed passageway connecting the interior and exterior frames of a pet door. The length of the wall entry tunnel adjusts to fit structural features of various thicknesses. The wall entry tunnel includes modular components that facilitate compact packaging and are readily assembled to construct the enclosed passageway with a perimeter sized to match the size of the pet door opening.

Figure 1:
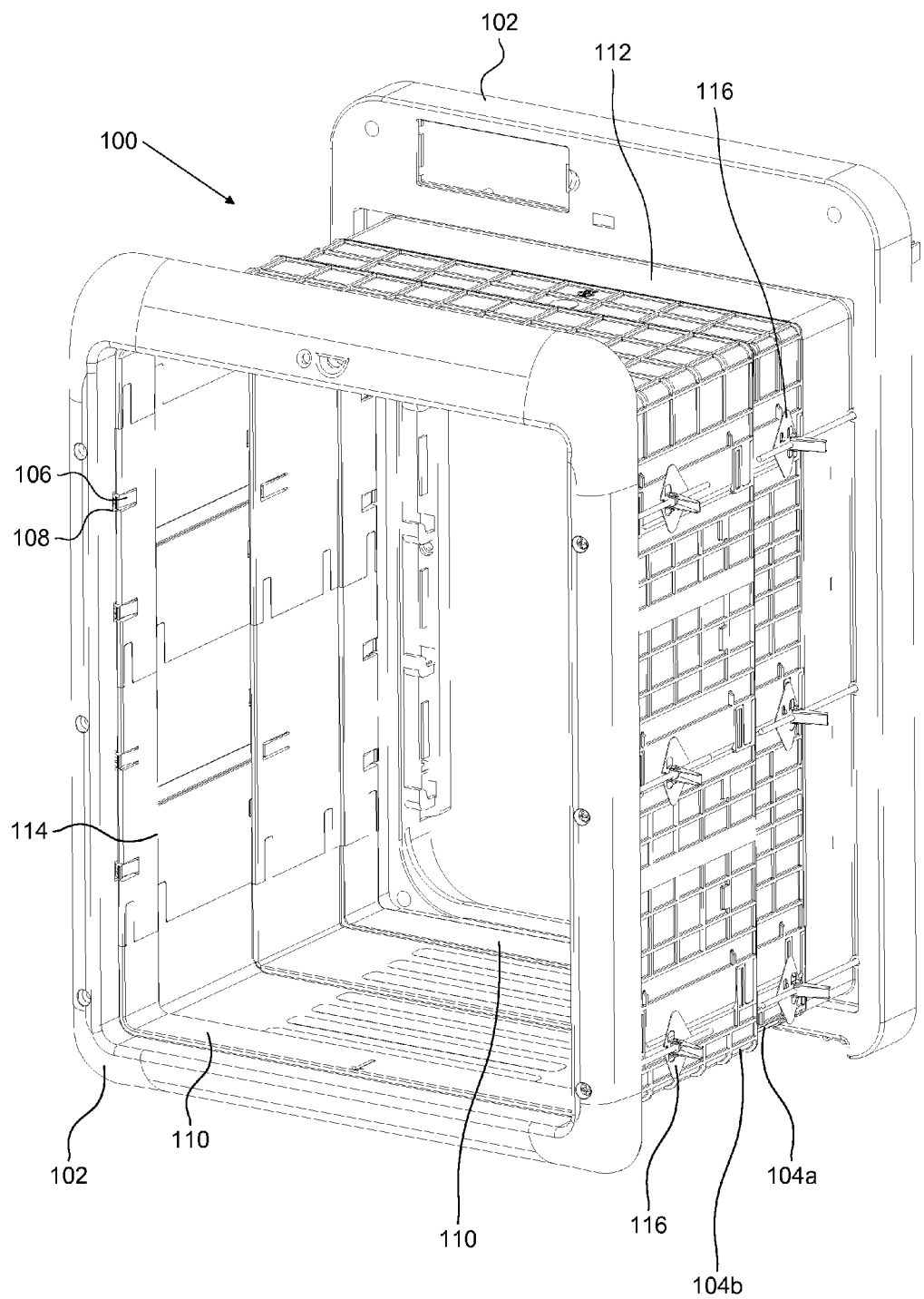
FIG. 1 is a perspective view of one embodiment of the assembled wall entry tunnel secured to the pet door frames.
Figure 2:
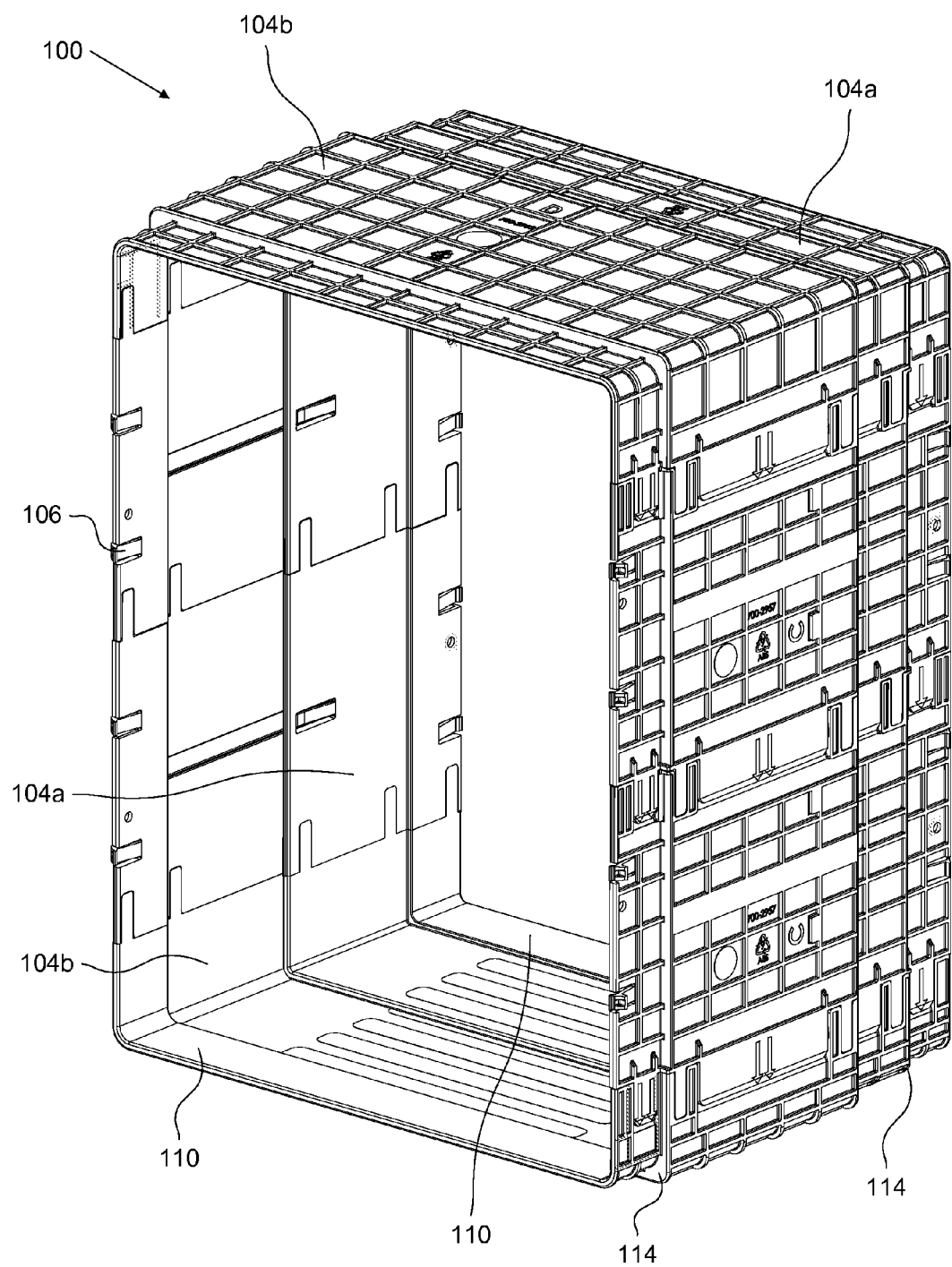
FIG. 2 is a perspective view of one embodiment of the assembled wall entry tunnel.

FIGS. 1 and 2 are perspective views of one embodiment of the wall entry tunnel connected to the frames of a pet door and by itself. The wall entry tunnel 100 forms an enclosed passageway between the frames 102 of a pet door. The cross sectional geometry of the wall entry tunnel 100 substantially matches the shape and dimensions of the pet door opening. In various embodiments, suitable cross sectional geometries for the wall entry tunnel include, but are not limited to, a rectangle, a square, a trapezoid, a triangle, and a circle. As used herein, terms of direction (e.g., front, rear, up, down, top, bottom, inner, outer, horizontal, vertical, etc.) are used to provide a frame of reference for purposes of discussion and are not intended to limit a feature of the wall entry tunnel to a single direction or orientation.

The length of the wall entry tunnel 100 is variable through non-destructive modification to match the thickness of the structural feature (e.g., wall) through which the wall entry tunnel passes. In various embodiments, the wall entry tunnel 100 includes two or more telescoping tunnel sections 104a, 104b that allow the length of the wall entry tunnel to be varied. In other words, the tunnel sections are connected such that an inner tunnel section 104a slides into an outer tunnel section 104b. The outer dimensions of the inner tunnel section 104a are slightly less than inner dimensions of the outer tunnel section 104b such that the inner tunnel section 104a fits inside the outer tunnel section 104b. This allows the inner tunnel section 104a and slide in and out relative to the outer tunnel section 104b to selectively adjust the length to match the thickness of the structural feature (e.g., the wall) where the wall entry tunnel 100 is installed. In other words, the inner tunnel section 104a and the outer tunnel section 104b are connected in a telescopic relationship. In some embodiments, at least one tunnel section may be cut, trimmed, or broken to remove significant excess length and then the length of the wall entry tunnel 100 is adjusted as described above. This allows precise fit of the wall entry tunnel 100 to the thickness of the structural feature without requiring precision cutting of the tunnel sections 104a, 104b. In some embodiments, the tunnel sections 104, 104b include one or more perforations or scores facilitating a clean break or cut at selected locations along the tunnel sections 104, 104b.

The tunnel sections 104a, 104b include one or more fasteners 106 located around the periphery and proximate to the outer edge for permanently or temporarily (i.e., releasably) attaching the wall entry tunnel 100 to the pet door frames 102. In various embodiments, the fasteners 106 mate with complimentary parts 108 appearing on the pet door frames 102. In the illustrated embodiment, the fasteners 106 are tabs that engage corresponding receptacles (e.g., recess or slots) defined by the pet door frames 102. Alternatively, the fasteners engage raised areas (e.g., ridges or lips) on the pet door frames 102. The fasteners optionally secure additional tunnel sections together. In other embodiments, the fasteners are replaced by connection points (e.g., through-openings) accepting a mechanical fastener (e.g., a screw or bolt) to secure the wall entry tunnel to the pet door frames 102. In some embodiments, the arrangement of the parts attaching the wall entry tunnel 100 to the pet door frames 102 are reversed. For example, the fasteners 106 may appear on the pet door frames 102 and the receptacles 108 may appear on the tunnel sections 104a, 104b.

In various embodiments, the edge portion 110 of the tunnel sections 104a, 104b engage the projections 112 of the pet door frames 102 bounding the pet door opening. In various embodiments, the edge portion 110 of the tunnel sections 104a, 104b fits over (or under) the projections 112 on the pet door frames 102 and the tunnel sections 104a, 104b include flanges 114 that engage the end of the projections 112 of the pet door frames 102. In some embodiments, the inner surfaces of the tunnel sections 104a, 104b are substantially planar and the edge portions 110 simply overlap the projections 112 of the pet door frames 102.

One challenge in installing a pet door with the wall entry tunnel in a structural feature is preventing the mounting hardware from rotating due to the lack of a secure mount point. For example, when installing the pet door in a structural feature with a thickness of approximately 76.2 mm (3 in) or less (e.g., a door), standard mounting hardware (e.g., a screw or bolt) extends between the pet door frames 102 and clamps the pet door to the structural feature. The frame itself includes a threaded receptacle that provides a stable attachment point for the mounting hardware. The threaded receptacle generally has a depth corresponding to some portion of the thickness of the frame part where it is located. The length of the internal threaded portion of the receptacle generally corresponds to the amount of adjustment available to accommodate structural features of different thicknesses. At this range of thickness, the threaded receptacle normally provides sufficient adjustability to accommodate to work with most doors using a single fastener length. For example, a threaded receptacle with an internally threaded portion having a length of approximately 25.4 mm (1.0 in) is easily accommodated by most pet door frames and, with a fastener having a length of approximately 44.4 mm (1.75 in), provides sufficient adjustability to work with most the most common door sizes.

The wall entry tunnel is designed to allow a standard pet door to be installed in structural features with a wide range of thicknesses. For structural features that vary in thickness over larger ranges, standard mounting solutions becomes problematic. In various embodiments, the wall entry tunnel is adjustable over a range of approximately 215.9 mm (8.5 in) or more with additional tunnel sections. To facilitate installation over such a large range of thickness, various embodiments of the wall entry tunnel provide mounting hardware 116 to use in place of that provided with the pet door. In various embodiments, the wall entry tunnel 110 includes an anti-rotation toggle bolt. In other embodiments, the wall entry tunnel 110 includes a threaded fastener (e.g., rod, bolt, or screw) and at least one binder post.

Figure 3:
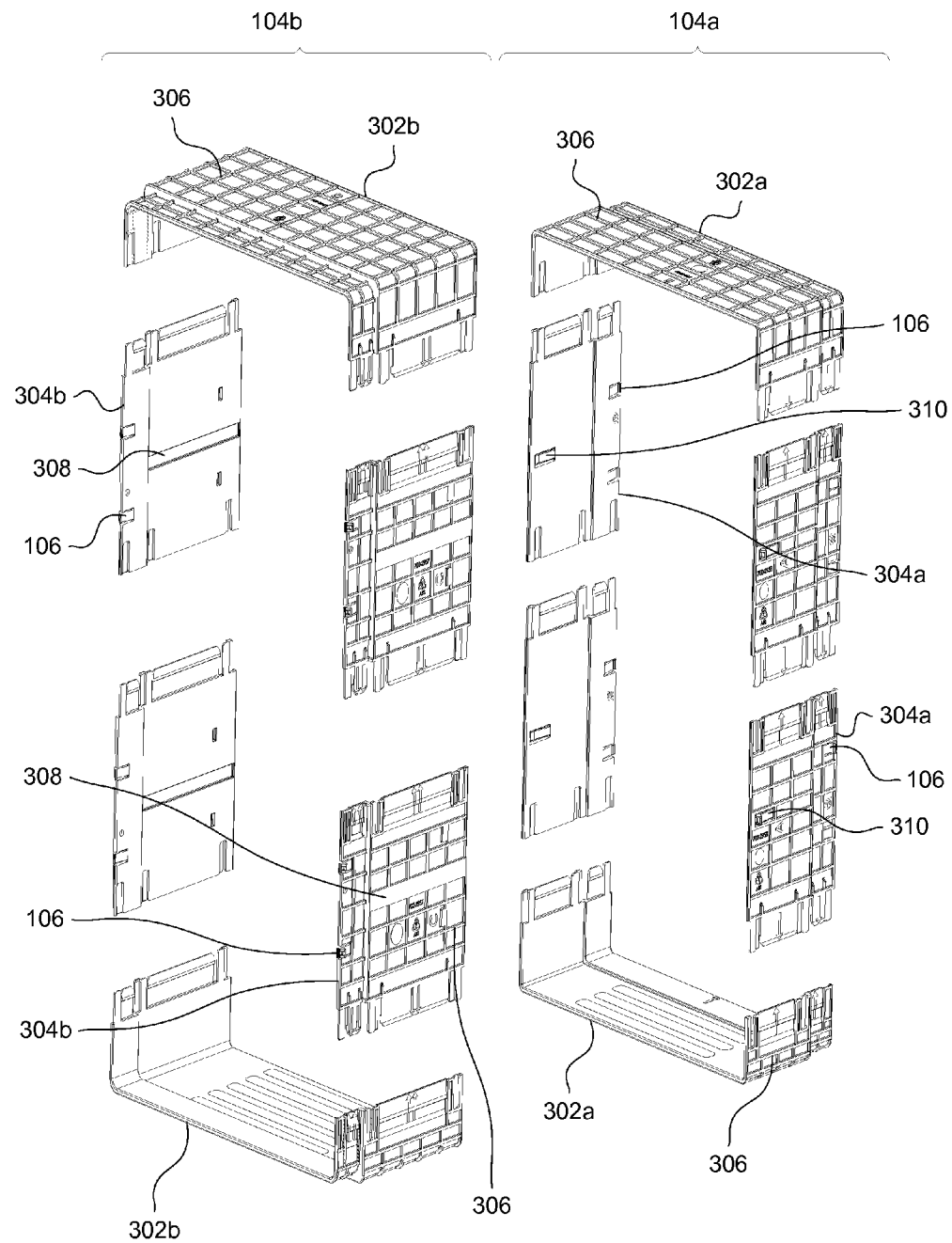
FIG. 3 is an exploded view of one embodiment of the wall entry tunnel.

FIG. 3 is an exploded view of one embodiment of the wall entry tunnel. The tunnel sections 104a, 104b are assembled from a plurality of connectable wall components including at least two horizontal wall components 302a, 302b. In various embodiments, the horizontal wall components 302a, 302b for each tunnel section 104a, 104b are typically identical in construction and differ only in orientation. As previously mentioned, the dimensions of the horizontal wall components 302a for the inner tunnel section 104a differ slightly from the dimensions of the horizontal wall components 302b. To incrementally vary the height of the wall entry tunnel 100, one or more vertical wall components 304a, 304b are combined to form the left and right vertical walls connected between the horizontal wall components 302a, 302b of each tunnel section 104a, 104b. In various embodiments, the horizontal wall components 302a, 302b and the vertical wall components 304a, 304b have ribs 306 that add strength and rigidity while minimizing the amount of material used.

The vertical wall components 304a, 304b have slide components connecting the inner tunnel section 104a to the outer tunnel section 104b in the sliding (i.e., telescopic) relationship previously mentioned. In various embodiments, the slide components include a groove 308 defined by one tunnel section and a slide 310 projecting from the tunnel section that operatively engages the groove 308. In other embodiments, the slide components include runners and guides.

Figure 4:
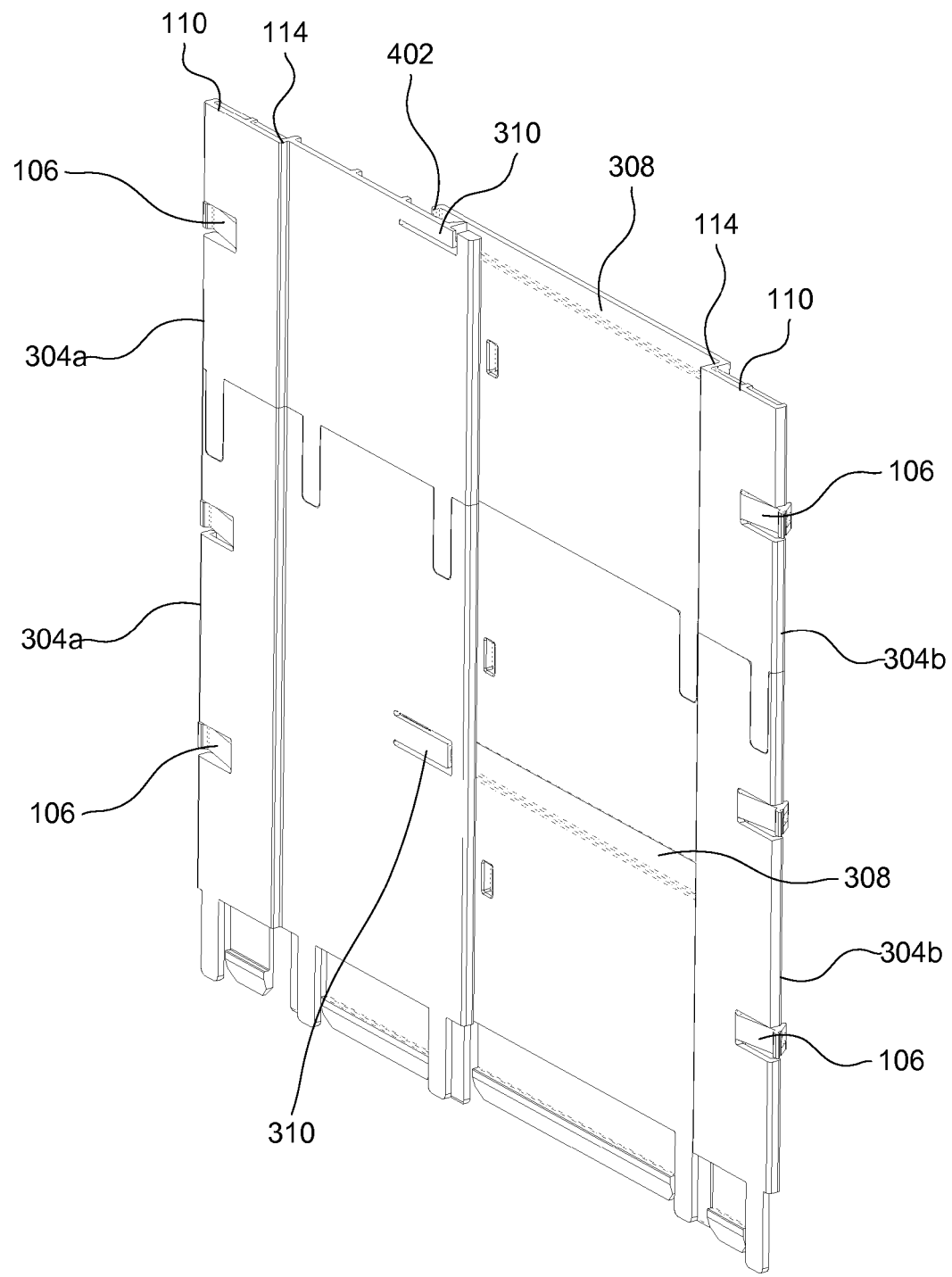
FIG. 4 is a sectional perspective view of a portion one embodiment of the wall entry tunnel taken through the groove to illustrate the telescopic relationship between the inner tunnel section and the outer tunnel section.

FIG. 4 is a sectional perspective view of a portion one embodiment of the wall entry tunnel taken through one of the grooves to illustrate the linkage between the tunnel sections 104a, 104b. In the illustrated embodiment, the vertical wall components 304a of the inner tunnel section 104a have outwardly projecting slides 310 that fit within cooperating grooves 308 defined by inside surface of the vertical wall components 304b of the outer tunnel section 104b. The slide 310 travels in the groove 308 allowing the length of the wall entry tunnel 100 to be selectively adjusted within the range allowed for by the groove 308. In various embodiments, the range of extension (i.e., the adjustable length) of the wall entry tunnel 100 is limited using slide stops 402 at one or both ends of the grooves 308 to limit the travel of the slides 310. The slide stops 402 also reduce or eliminate the likelihood that the inner tunnel section 104a will become separated from the outer tunnel section 104b. In some embodiments, the grooves 308 include end walls that operate as the slide stops 402. In various embodiments, the slides 310 are at least partially displaceable (e.g., a tab fixed at only one end) allowing the inner tunnel section 104a to be detached from the outer tunnel section 104b with the application of sufficient force to render the slides 310 flush with the sides of the vertical wall components 304a. In some embodiments, the arrangement of the grooves and the slides (or other complimentary fastener parts) is reversed. For example, grooves may be defined by the outer surface of the vertical wall components of the inner tunnel sections and the vertical wall components of the outer tunnel sections may have inwardly projecting slides. Alternatively, the grooves and slides may be arranged on the horizontal wall sections.

In various embodiments, the position of the inner tunnel section 104a relative to the outer tunnel section 104a is fixed once the wall entry tunnel 100 has been adjusted to the proper length. In some embodiments, the wall entry tunnel 100 includes features that resist the relative movement of the tunnel sections 104a, 104b. In some embodiments, mechanical adjusters (e.g., wires and pulleys, springs, cams and slides, gear systems, and ratcheting systems) resist the relative movement of the tunnel sections 104a, 104b. In some embodiments, the mechanical adjusters impart minimum force that must be overcome before the inner tunnel section will move relative to the outer tunnel section. In some embodiments, the groove and slide form a ratchet where a pawl at the end of the slide engages a plurality of teeth defined by the groove allowing the slide to grip and hold the relative positions of the tunnel sections 104a, 104b for different wall thicknesses. In other embodiments, the tunnel sections 104a, 104b are permanently or temporarily secured together. In some embodiments, mechanical fasteners (e.g., nuts and bolts, hook and loop fasteners, screws, pins, or compression fittings) or adhesives are used to secure the tunnel sections together. In still other embodiments, the tunnel sections 104a, 104b are biased away from each other so the wall entry tunnel 100 normally expands to the maximum length until fixed in a compressed state by installation in a structural feature. In some embodiments, the slide stops 402 are part of the mechanical adjustment system. In other words, the mechanical adjustment system moves the locations of the slide stops 402.

Figure 5:
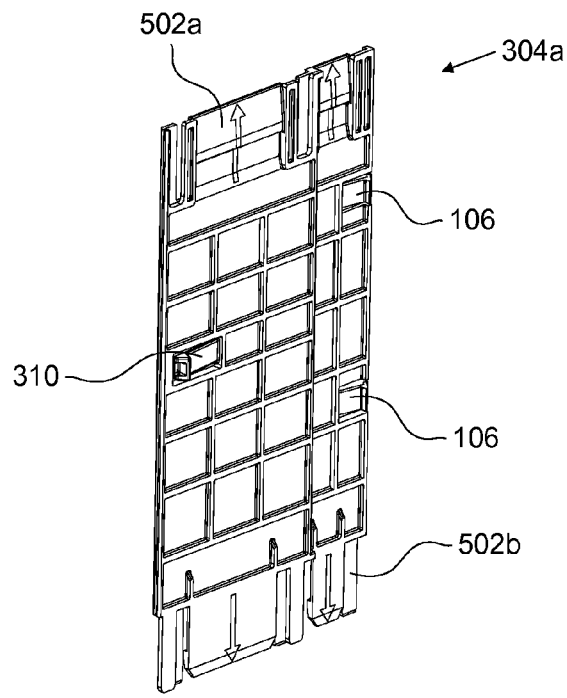
FIG. 5 is a perspective view of one embodiment of the inner vertical wall component.
Figure 6:
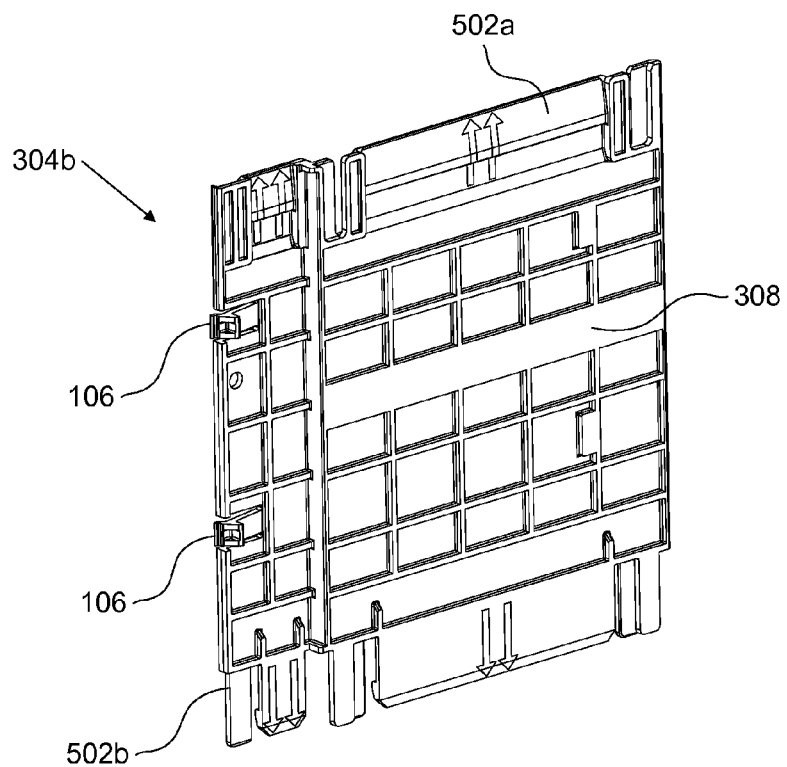
FIG. 6 is a perspective view of one embodiment of the outer vertical wall component.
Figure 18:
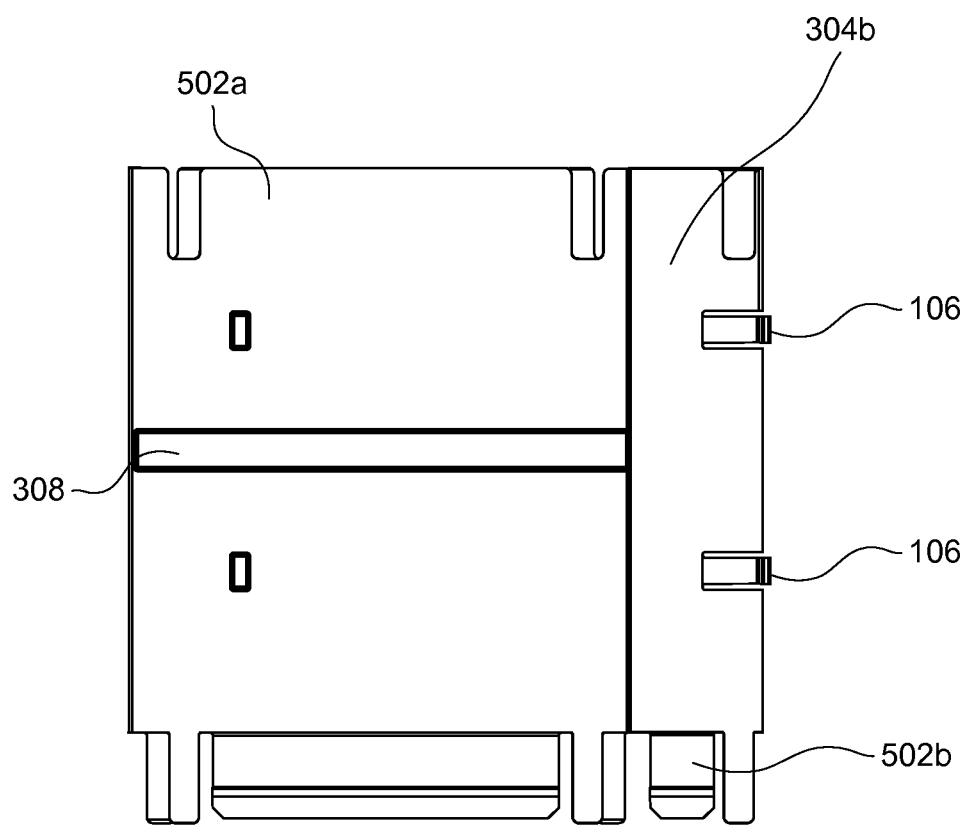
FIG. 18 is a bottom plan view of one embodiment of the outer vertical wall component.

FIGS. 5 and 6 are perspective views of one embodiment of the inner vertical wall component 304a and the outer vertical wall component 304b. Additional views of one embodiment of the inner vertical wall component are shown in FIGS. 7 through 12, and additional views of one embodiment of the outer vertical wall component are shown in FIGS. 13 through 18. Each vertical wall component 304a, 304b is a substantially planar member with top end 502a and a bottom end 502b. The vertical wall components 304a, 304b are configured to be interconnected. Specifically, the top and bottom ends 502a, 502b of the vertical wall components 304a, 304b are configured to connect with another vertical wall component of the same type to create a vertical wall of a selected height. In other words, the inner vertical wall components 304a are connectable with other inner vertical wall components 304a and the outer vertical wall components 304b are connectable with other outer vertical wall components 304b. In various embodiments, the ends of the vertical wall components are connectors (e.g., as snaps or clips). In some embodiments, the top and bottom ends 502a, 502b of the vertical wall components 304a, 304b interlock when connected. In the some embodiments, the connectors are snap fittings including a flexible latch that fits into a fixed receiver portion with the snap detail oriented to hold the assembly together in tension.

The connectors cooperate to provide a secure fit between the vertical wall components. In various embodiments, the connectors form permanent connections once connected. In other embodiments, the connectors form releasable connections for non-destructive disassembly. A secure fit is generally desirable because once the wall entry tunnel 100 is installed within the structural feature, reconnecting loose connections becomes problematic without uninstallation. While permanent connections are not required, some embodiments of the connectors create connections that are difficult to disassemble. In some embodiments, the connectors do not require the use of tools for assembly or disassembly (e.g., snap fittings). In other embodiments, the connectors require the use of tools for assembly or disassembly (e.g., twist lock cams).

Figure 19:
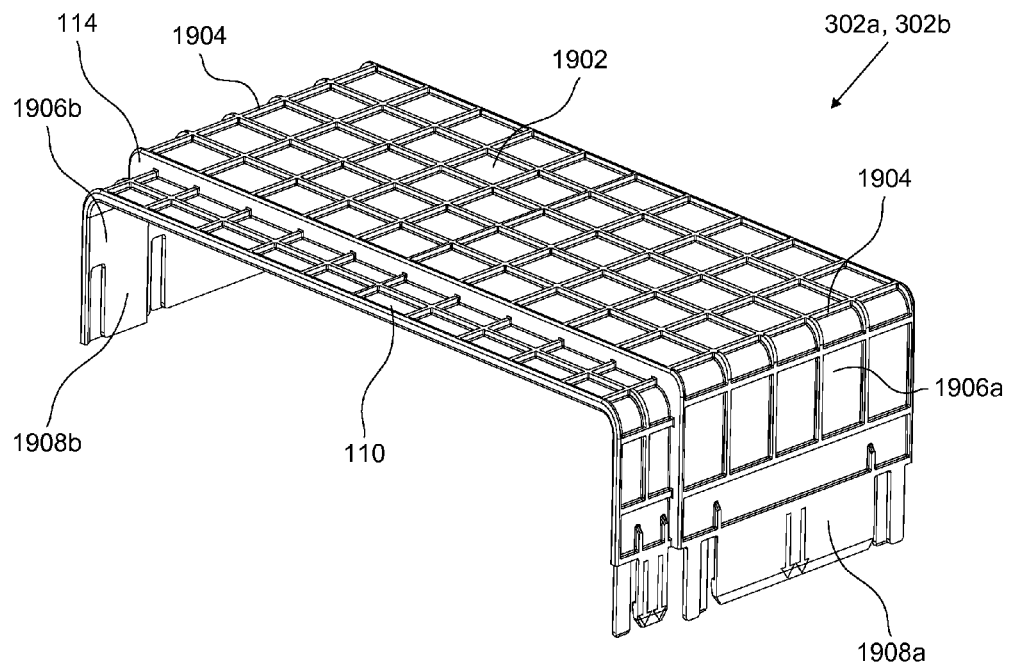
FIG. 19 is a top perspective view of one embodiment of the horizontal wall component.
Figure 20:
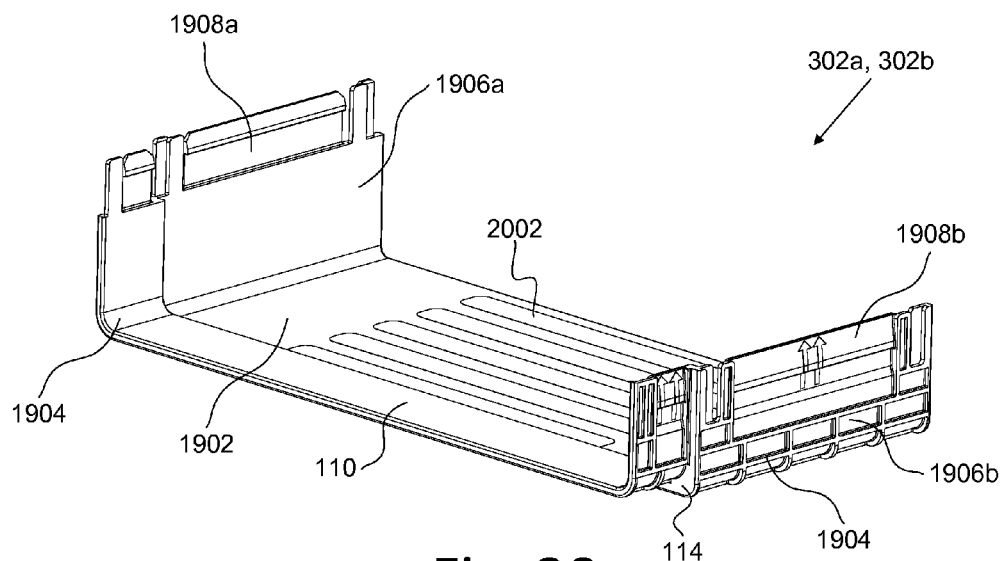
FIG. 20 is a bottom perspective view of one embodiment of the horizontal wall component.
Figure 21:
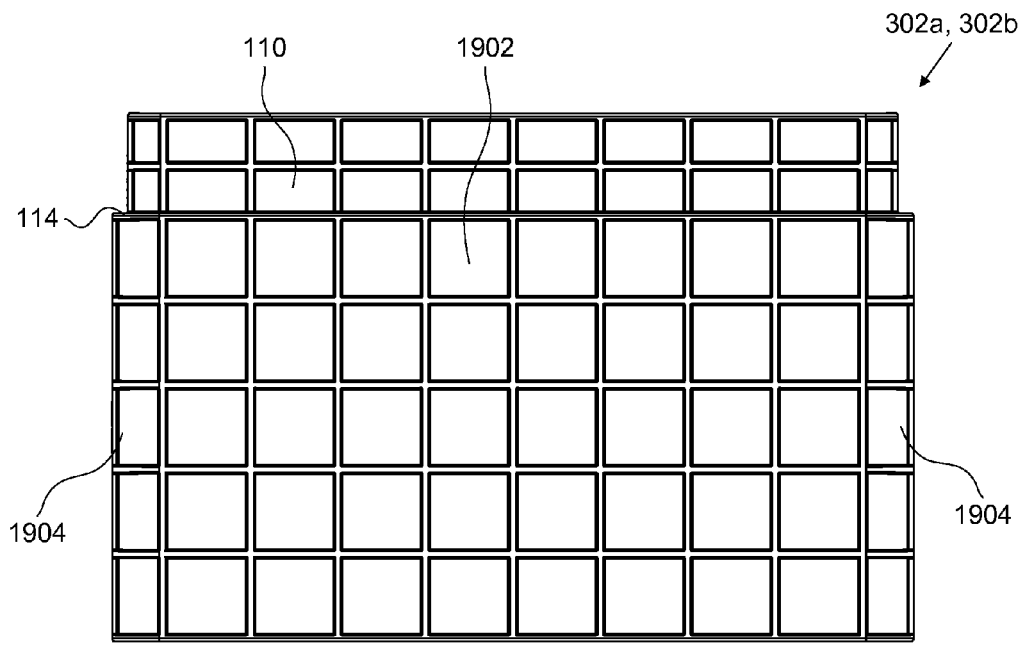
FIG. 21 is a top plan view of one embodiment of the horizontal wall component.
Figure 22:
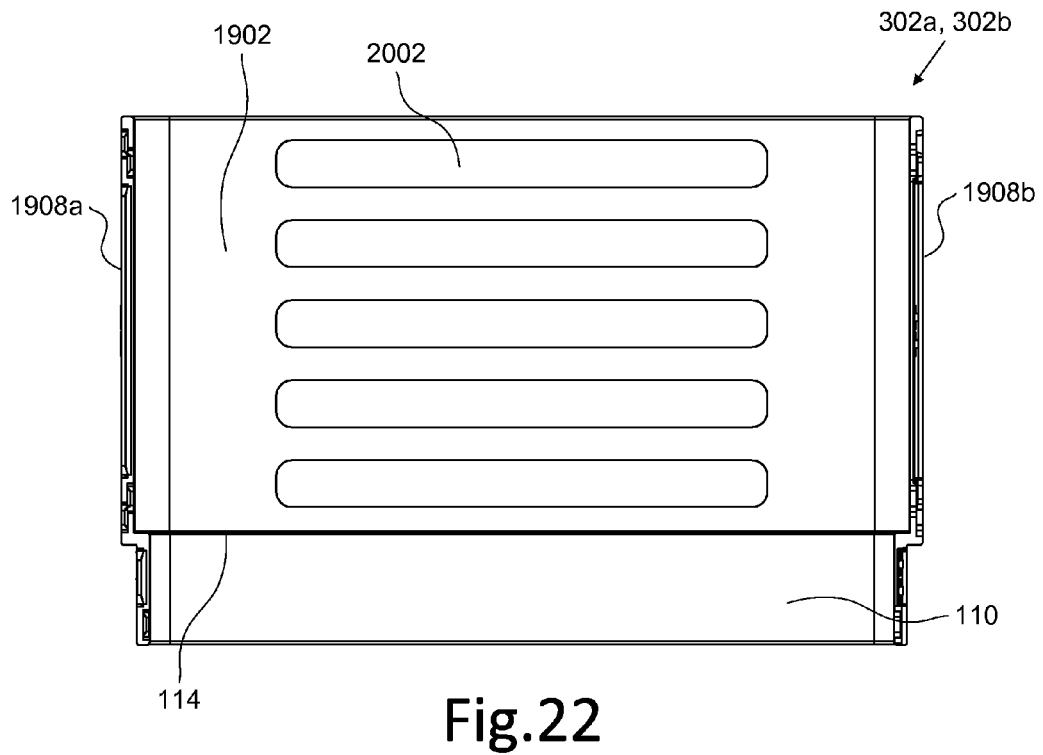
FIG. 22 is a bottom plan view of one embodiment of the horizontal wall component.
Figure 23:
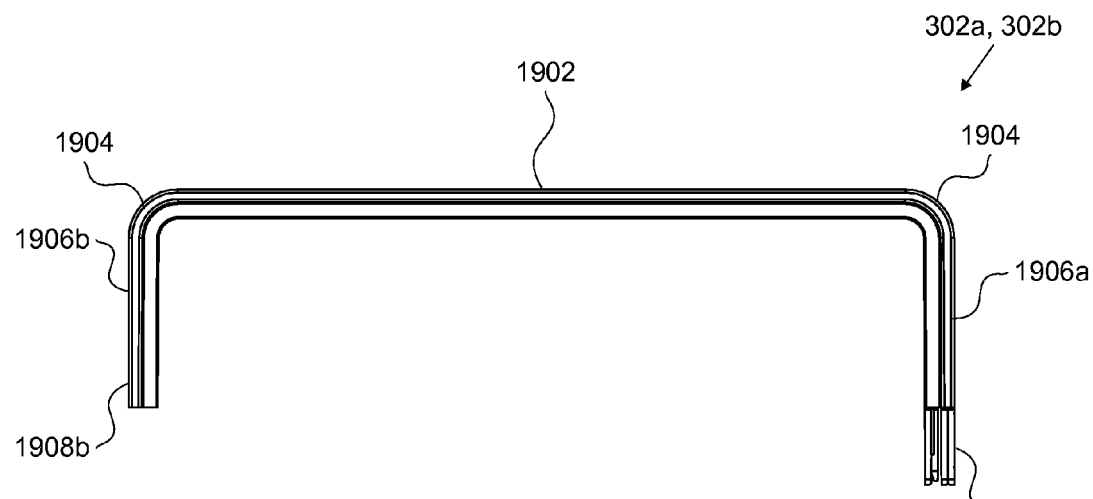
FIG. 23 is a front elevation view of one embodiment of the horizontal wall component.
Figure 24:
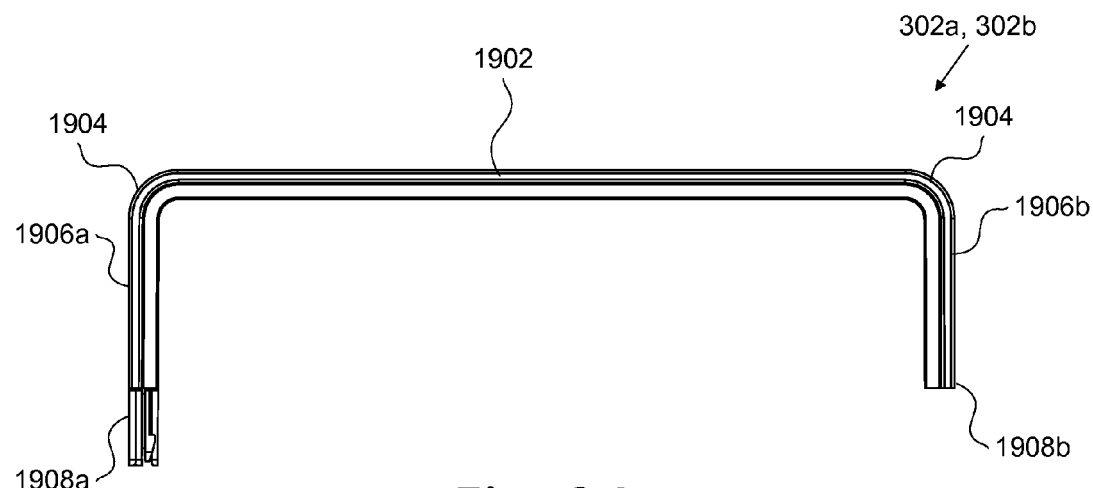
FIG. 24 is a rear elevation view of one embodiment of the horizontal wall component.

FIGS. 19 and 20 are perspective views of one embodiment of the horizontal wall component from the top and bottom, respectively. Additional views of one embodiment of the horizontal wall component are shown in FIGS. 21 through 26. The horizontal wall component includes a horizontal section 1902, which is substantially planar, between two corner sections 1904. In various embodiments, the corners sections define arcuate or rounded (i.e., chamfered) corners. In other embodiments, the corners sections define substantially square corners. Each corner section transitions into a vertical extension 1906a, 1906b that is substantially perpendicular to the horizontal section 1902. In various embodiments, some or all of the interior surfaces of the wall entry tunnel 100 include texturing and/or traction strips 2002. In some embodiments, only the interior surfaces of the horizontal wall components 302a, 302b include texturing and/or traction strips 2002.

As pet doors have different opening dimensions based on the size of the pet, the overall height of the wall entry tunnel is based on the height of the vertical extensions 1906a, 1906b of the horizontal wall components 302a, 302b, the height of the vertical wall components 304a, 304b, and the number of vertical wall components 304a, 304b connected together. Typically, the height of a single vertical wall component is standardized as an increment of the height of the pet door opening. In various embodiments, the height of a single vertical wall component corresponds to a portion of the height of a small pet door opening. The height of the vertical extensions of the horizontal wall component is based on the difference between the vertical wall component height and the height of the pet door opening. This allows the same vertical wall components to be used with different sized horizontal wall components to assemble wall entry tunnels for different sized pet door openings. In other words, various embodiments customize the dimensions of the horizontal wall components to work with standard vertical wall components for different sized pet door openings.

In various embodiments, the horizontal wall component is a unitary component with a width sized to a particular pet door opening width. As discussed above, the height of the vertical extensions of the horizontal wall component is determined by difference between the vertical wall component height and the height of the particular pet door opening. In other embodiments, the horizontal wall component is a multiple piece assembly including two corner pieces and one or more horizontal members. Similar to the vertical wall components, the horizontal members are sized to be some portion of the horizontal dimension of the pet door opening. The corner piece retains the vertical extension as well as adding horizontal extension with length based on the difference between the horizontal member length and the width of the particular pet door opening. In other words, the multi-piece horizontal wall component provides variability in width in addition to variability in height.

The ends 1908a, 1908b of the vertical extensions 1906a, 1906b are configured to connect to the top and bottom ends 502a, 502b of the vertical wall components 304a, 304b forming part of the corresponding tunnel section 104a, 104b. In other words, the inner horizontal wall components 302a connect to the inner vertical wall components 304a and the outer horizontal wall components 302b connect to the outer vertical wall components 304b. In various embodiments, the connectors defined by the ends 1908a, 1908b of the vertical extensions 1906a, 1906b and the top and bottom ends 502a, 502b of the vertical wall components 304a, 304b are keyed to maintain the orientation of the wall components being joined.

Figure 30:
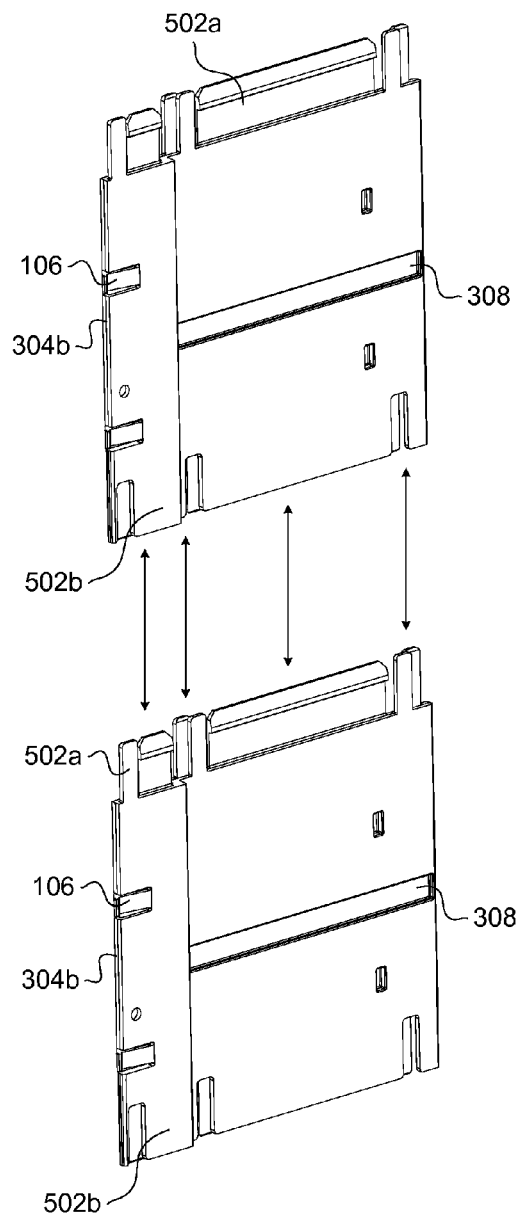
FIG. 30 is an exploded top perspective view of one embodiment of two outer vertical wall components aligned for assembly.
Figure 31:
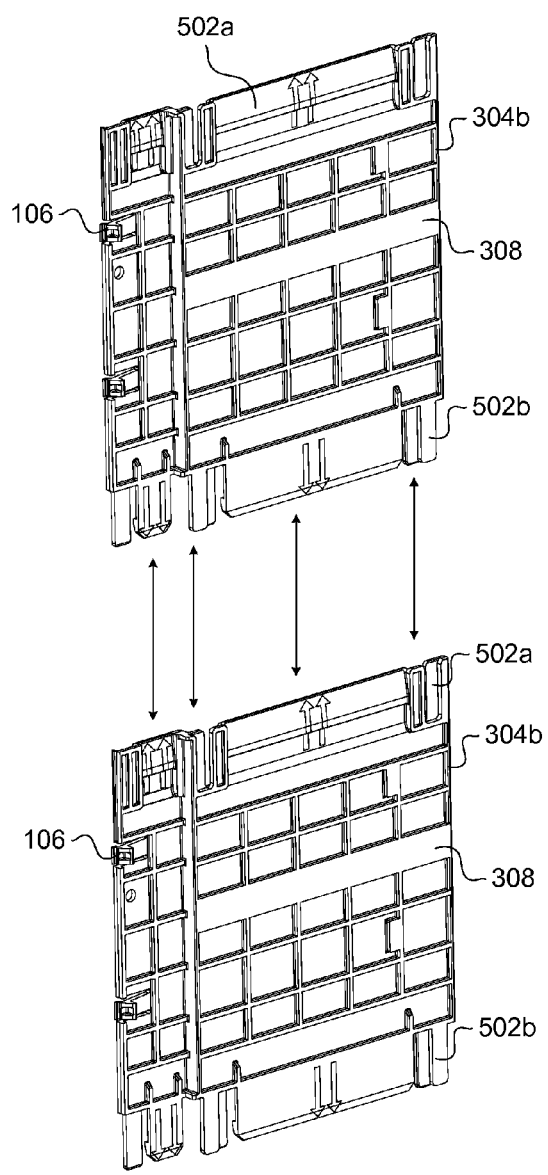
FIG. 31 is an exploded bottom perspective view of one embodiment of two outer vertical wall components aligned for assembly.

FIG. 27 is a sectional front elevation view of one embodiment of the horizontal wall component and FIGS. 28 and 29 are detail views of the first and second keyed connectors 502a, 502b. FIGS. 30 and 31 are exploded front and rear perspective views of vertical wall components aligned for assembly. Controlling the relative orientation of the wall components during assembly ensures that the orientation of the frame locking tabs, and grooves 308, and slides 310 remains consistent and avoids the need to disassemble wall components due to mis-orientation of the slides or grooves. In various embodiments, the ends 502a, 502b includes complimentary key components (e.g., alignment tabs and corresponding slots) to aid the assembly process. The alignment tabs fit into the slots to properly align the wall components prior to reaching the point where the connectors interlock. For the horizontal wall components, when oppositely oriented (i.e., one opening upwardly and the other opening downwardly), the key components are aligned with the complimentary key components on the other horizontal wall component. For the vertical wall components, the key components are aligned with the complimentary key components on the other vertical wall component when oriented in the same direction. In other embodiments, the connectors defined by the ends 502a, 502b, 1908a, 1908b of the wall components have the same gender and separate linking member having the opposite gender connector at each end is used to connect the two wall components. In various embodiments, the height of the vertical extensions 1906a, 1906b differs between the ends of the horizontal wall components 302a, 302b to provide a physical indication of the proper orientation for connecting the keyed connectors. In other words, one vertical extension has a longer length than the other. In some embodiments, the lengths of the vertical extensions are equal.

Figure 32:
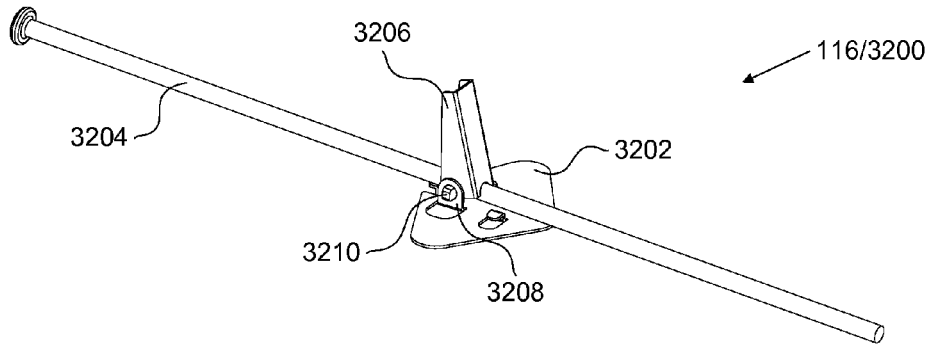
FIG. 32 is a perspective view of one embodiment of an anti-rotation toggle bolt.
Figure 33:
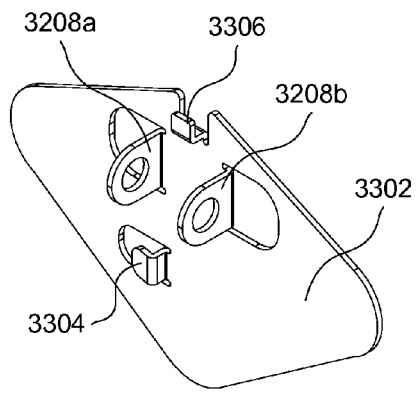
FIG. 33 is a perspective view of one embodiment of a toggle shoe from the anti-rotation toggle bolt.
Figure 34:
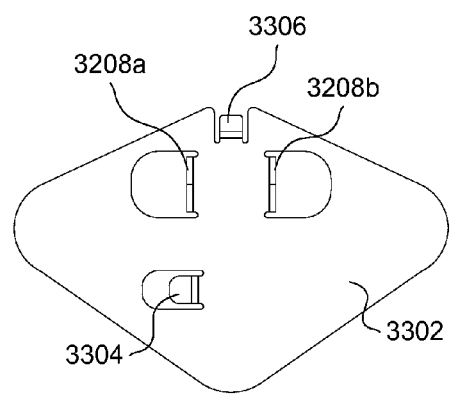
FIG. 34 is a top plan view of one embodiment of the toggle shoe.
Figures 35, 36:
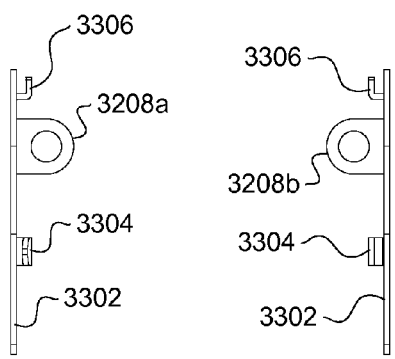
FIG. 35 is a left side elevation view of one embodiment of the toggle shoe.
FIG. 36 is a right side elevation view of one embodiment of the toggle shoe.
Figure 37:
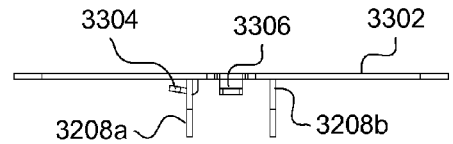
FIG. 37 is a rear elevation view of one embodiment of the toggle shoe.
Figure 38:
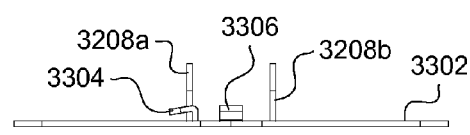
FIG. 38 is a front elevation view of one embodiment of the toggle shoe.

FIG. 32 is a perspective view of one embodiment of an anti-rotation toggle bolt 3200. The anti-rotation toggle bolt assembly 3200 includes a shoe 3202 carrying a bolt 3204 and a toggle arm 3206. The toggle arm 3206 is attached to the anchor point 3208 of the shoe 3202 by a pivot pin 3210. When engaged by the bolt 3204, the toggle arm 3206 extends outwardly from the shoe 3202 to securely engage the edge of the opening in the structural feature where the wall entry tunnel 100 is being installed. In various embodiments, the shoe 3202 is integrated into, attached to, or attachable to, the wall entry tunnel 100 (as shown in FIG. 1) or to one of the pet door frames 102. The anti-rotation toggle bolt assembly 3200 keeps the toggle arm 3206 perpendicular to the structural wall edge properly positioning the toggle arm to engage the inside surface of the structural feature. The anti-rotation toggle shoe 3202 allows tightening of the bolt 3204 causing the toggle arm 3206 to move toward the inside surface of the structural feature while keeping the toggle arm 3206 from rotating. In various embodiments, the anti-rotation toggle shoe 3202 is moveably connected to the wall entry tunnel 100 such that the shoe 3202 slides along the surface of the wall entry tunnel 100 toward the structural feature without rotating as the bolt 3204 is tightened.

FIGS. 33 through 38 are perspective, top plan, rear elevation, front elevation, left side elevation, and right side elevation views, respectively, of one embodiment of the toggle shoe. The shoe includes a base 3302 and supporting the anchor 3208 that receives the toggle arm 3206. In the illustrated embodiment, the attachment point 3302 includes two projections 3208a, 3208b defining through openings that hold the ends of the pivot pin 3210 passing through the toggle arm 3204. In various embodiments, the toggle arm 3206 is biased to a normally open (i.e., extended) position by a spring (not shown) connected between the base 3302 and the toggle arm 3206. In this position, the toggle arm 3206 is in operative engagement with the threads of the bolt 3204. In the illustrated embodiment, the base includes a hook 3304 or similar structure for receiving one end of the biasing spring. The other end of the biasing spring moves the toggle arm 3206 towards a normal position substantially perpendicular to the base. During installation, the wall bounding the opening where the wall entry tunnel is being installed overcomes the bias of the spring and forces the toggle arm 3206 to fold to a position substantially parallel to the wall components of the wall entry tunnel 100. Once beyond the thickness of the wall, the toggle arm 3206 is no longer constrained by the wall allowing the spring to return the toggle arm 3206 to the normally extended (i.e., perpendicular) position. In various embodiments, the anti-rotation toggle bolt 3200 includes a bolt support 3306 that holds the bolt 3204 away from base and increases the force at the interface between the bolt 3204 and the toggle arm 3206.

Figure 39:
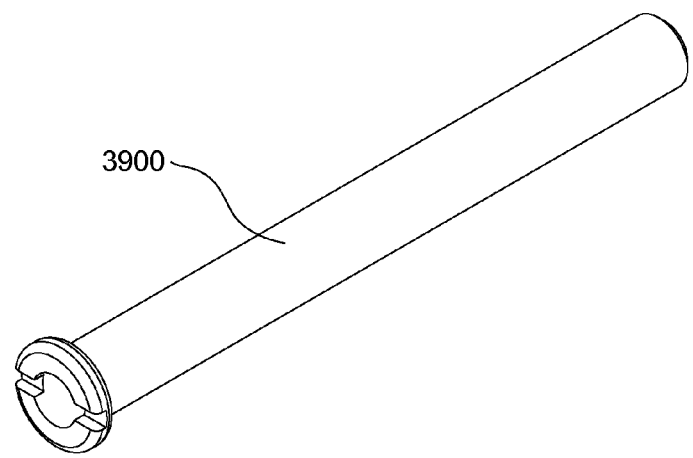
FIG. 39 is a perspective view of one embodiment of a binder post.
Figure 40:
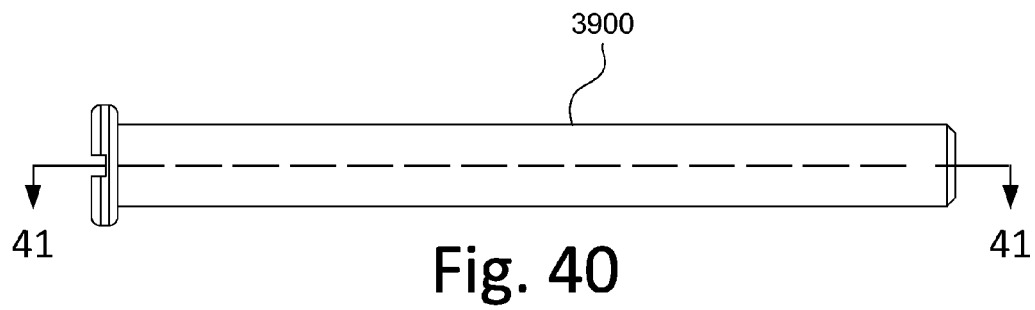
FIG. 40 is a left side elevation view of one embodiment of the binder post.
Figure 41:
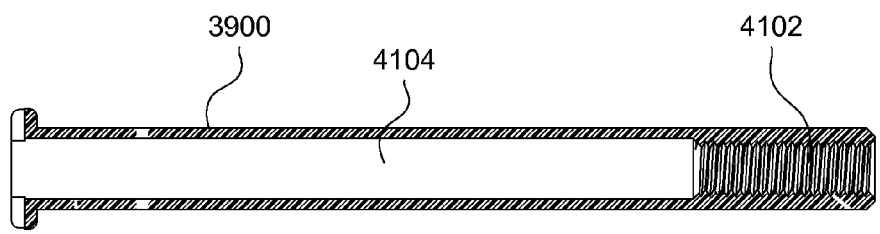
FIG. 41 is a sectional side elevation view of one embodiment of the binder post taken along line 41-41 in FIG. 40.

In other embodiments, the wall entry tunnel includes a threaded fastener (e.g., rod, bolt, or screw) and at least one binder post. FIGS. 39-41 illustrate one embodiment of the binder post 3900 used with the wall entry tunnel 100. The binder post 3900 operates similarly to the threaded receptacle of the conventional pet door and allows limited adjustment of the thickness based on the lengths of the internally threaded portion 4102 and the hollow portion 4104 of the binder post 3900. For greater adjustment, a threaded fastener of different length is used (e.g., the threaded fastener is cut to length). In various embodiments, one end of the threaded fastener includes a head (e.g., a screw or bolt) and the binder post is attached to the other end. In other embodiments, the threaded fastener is headless (e.g., a rod) with a binder post attached to one end and a nut or another binder post attached to the other end. When two binder posts are used, one binder post must be stabilized while the other binder post is tightened to avoid free rotation of the fastener. In other embodiments, two nuts used and, like when using two binder posts, one nut must be stabilized while the other nut is tightened to avoid free rotation of the fastener.

In various embodiments, a traditional toggle bolt is used with disabled (e.g., by removing the toggle arm, by securing the toggle arm in the folded position, or by removing the biasing spring) and preventing the toggle bolt from rotating using a retaining clip securable to the outer surface of wall entry tunnel. In some embodiments, the retaining clip holds one of the toggle arms closed. In some embodiments, the toggle arm that is not disabled is provided with a wide engagement surface (e.g., by replacing the toggle arm with a wide surface toggle arm or adding a wide surface attachment to the existing toggle arm. In some embodiments, the wall entry tunnel includes a smooth rod and at least one friction-fit clip (e.g., c-clips or e-clips), washer (e.g., a star washers), or hat fastener that is pushed onto the rod.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A tunnel for use with a pet door having an interior frame and an exterior frame located on opposing sides of a structural unit, each of the interior frame and the exterior frame defining a through opening, said tunnel comprising:
   a first section defining a through opening, said first section adapted to connect to said interior frame such that said interior frame through opening allows entry into said first section through opening, said first section comprising:
      a first horizontal wall component having a first end and a second end;
      a second horizontal wall component having a first end and a second end;
      a first vertical wall having a first end and a second end, said first vertical wall connectable to said first end of said first horizontal wall component and second horizontal wall component second end; and
      a second vertical wall having a first end and a second end, said second vertical wall connectable to said second end of said first horizontal wall component and said first end of said second horizontal wall component;
   a second section defining a through opening, said second section adapted to connect to said exterior frame such that said exterior frame through opening allows entry into said second section through opening, said second section telescopically connected to said first section, said second section through opening cooperating with said first section through opening to define a passageway, said second section comprising:
      a first horizontal wall component having a first end and a second end;
      a second horizontal wall component having a first end and a second end;
      a first vertical wall having a first end and a second end, said first vertical wall connectable to said first end of said first horizontal wall component and said second end of said second horizontal wall component; and
      a second vertical wall having a first end and a second end, said second vertical wall connectable to said second end of said first horizontal wall component and said first end of said second horizontal wall component;
   wherein said first horizontal wall component first end, said second horizontal wall component first end, said first vertical wall component first end, and said second vertical wall component first end of said first section and said second section each define a first connector; and
   said first horizontal wall component second end, said second horizontal wall component second end, said first vertical wall component second end, and said second vertical wall component second end of said first section and said second section each define a second connector, said second connectors configured to connect to said first connectors.

2. The tunnel of claim 1 characterized in that said horizontal wall components have an internal width corresponding to the side-to-side width of the through opening.

3. The tunnel of claim 1 characterized in that said horizontal wall components have a first vertical extension associated with said first end and a second vertical extension associated with said second end.

4. The tunnel of claim 1 characterized in that said first vertical wall comprises:
   a first vertical wall component having a first end and a second end, said first end connectable to said second end of said second horizontal wall component; and
   a second vertical wall component having a first end and a second end, said second vertical wall component first end connectable to said first vertical wall component second end and said second vertical wall component second end connectable to said first horizontal wall component first end.

5. The tunnel of claim 4 characterized in that said first ends and said second ends of said first horizontal wall component, said second horizontal wall component, said first vertical wall component, and said second vertical wall component are keyed such that said first ends connect only to said second ends.

6. The tunnel of claim 1 characterized in that said first vertical wall comprises a vertical wall component having a first end and a second end, said vertical wall component first end connectable to said first horizontal wall component first end and said vertical wall component second end connectable to said second horizontal wall component second end.

7. The tunnel of claimer 1 characterized in that said first connectors and said second connectors are keyed such that said first connectors only connect with said second connectors.

8. The tunnel of claim 1 further comprising:
   a first anti-rotation toggle bolt assembly having a toggle shoe and a toggle arm extending outwardly from the toggle shoe, said first anti-rotation toggle bolt assembly 2014-10-10 connected to said first section, said first toggle arm operatively engaging a first fastener passing through the interior frame allowing the first fastener to be tightened and draw the interior frame securely against the structural unit without rotation of said first toggle arm; and
   a second anti-rotation toggle bolt assembly having a toggle shoe and a toggle arm extending outwardly from the toggle shoe, said second anti-rotation toggle bolt assembly connected to said second section, said second toggle shoe arm operatively engaging a second fastener passing through the exterior frame allowing the second fastener to be tightened and draw the interior frame securely against the structural unit without rotation of said second toggle arm.

9. A variable length tunnel for connecting the frames of a pet door installed in a structural feature, said variable length tunnel comprising:
   a first tunnel section connectable to a frame of the pet door; and
   a second tunnel section connectable to the other frame of the pet door, said second tunnel section coupling with and moveable relative to said first tunnel section to vary the length of said tunnel when said second tunnel section and said first tunnel section are connected;
   wherein each said first tunnel section and said second tunnel section are assembled from a plurality of components, said plurality of components including an upper horizontal component, a lower horizontal component, a left vertical wall comprising at least one vertical wall component, and a right vertical wall comprising at least one vertical wall component:
   each component defines at least a first connector and a second connector, said connectors cooperatively joining one said component to another said component: and
   said first connector and said second connector having complimentary keys such that said first connector of one said component only connects to said second connector of another said component.

10. The variable length tunnel of claim 9 characterized in that said upper horizontal component and said lower horizontal component have an internal width corresponding to the side-to-side width the pet door opening.

11. The variable length tunnel of claim 9 characterized in that said upper horizontal component and said lower horizontal component have left and right vertical extensions giving said first and second tunnel sections an internal height corresponding to the height of the pet door opening.

12. The variable length tunnel of claim 9 characterized in that:
   said first tunnel section includes at least one groove extending at least a portion of the length of said first tunnel section; and
   said second tunnel section includes at least one slide operatively engaging and positionable along the length of said at least one groove.

13. The variable length tunnel of claim 9 characterized in that the interior dimensions of said first tunnel section are larger than the exterior dimensions of said second tunnel section, said second tunnel section fitting into said first tunnel section in a telescopic relationship.

14. The variable length tunnel of claim 9 characterized in that each of the frames of the pet door have a flange bounding an opening defined by the pet door, a portion of said first tunnel section configured to overlap one of said flanges and a portion of said second tunnel section configured to overlap the other of said flanges.

15. The variable length tunnel of claim 9 further comprising:
   a first anti-rotation toggle shoe attached to said first tunnel section, said first anti-rotation toggle shoe having a toggle arm extending away from said first tunnel section to operatively engage the structural feature; and
   a second anti-rotation toggle shoe attached to said first tunnel section, said second anti-rotation toggle shoe having a toggle arm extending away from said first tunnel section to operatively engage the structural feature.

16. A tunnel for use with a pet door having an interior frame and an exterior frame located on opposing sides of a structural unit, each of the interior frame and the exterior frame defining a through opening, said tunnel comprising:
   a first section defining a through opening, said first section adapted to connect to said interior frame such that said interior frame through opening allows entry into said first section through opening, said first section comprising:
      a first horizontal wall component having a first end and a second end;
      a second horizontal wall component having a first end and a second end;
      a first vertical wall having a first end and a second end, said first vertical wall connectable to said first end of said first horizontal wall component and said second horizontal wall component second end; and
      a second vertical wall having a first end and a second end, said second vertical wall connectable to said second end of said first horizontal wall component and said first end of said second horizontal wall component;
   a second section defining a through opening, said second section adapted to connect to said exterior frame such that said exterior frame through opening allows entry into said second section through opening, said second section telescopically connected to said first section, said second section through opening cooperating with said first section through opening to define a passageway, said second section comprising:
      a first horizontal wall component having a first end and a second end;
      a second horizontal wall component having a first end and a second end;
      a first vertical wall having a first end and a second end, said first vertical wall connectable to said first end of said first horizontal wall component and said second end of said second horizontal wall component; and
      a second vertical wall having a first end and a second end, said second vertical wall connectable to said second end of said first horizontal wall component and said first end of said second horizontal wall component; and
   wherein first ends and said second ends of said first horizontal wall component, said second horizontal wall component, said first vertical wall, and said second vertical wall are keyed such that said first ends connect only to said second ends.

17. The tunnel of claim 16 characterized in that the horizontal walls comprise a plurality of wall components, each horizontal wall component having a first connector at one end and a second connector at the other end, the first connector of one wall component selectively joinable to the second connector of another wall component to form the horizontal wall having a first connector at one end and a second connector at the other end.

* * * * *